US012713245B2

(12) United States Patent
Ji et al.

(10) Patent No.: US 12,713,245 B2
(45) Date of Patent: Aug. 18, 2026

(54) METHOD FOR SCHEDULING SPECTRUM RESOURCE AND STORAGE MEDIUM

(71) Applicant: ZTE CORPORATION, Shenzhen (CN)

(72) Inventors: Wangwang Ji, Shenzhen (CN); Qiaoyan Liu, Shenzhen (CN); Kai Mao, Shenzhen (CN); Jianguo Li, Shenzhen (CN); Miao Fan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 431 days.

(21) Appl. No.: 18/339,202

(22) Filed: Jun. 21, 2023

(65) Prior Publication Data

US 2023/0337006 A1 Oct. 19, 2023

Related U.S. Application Data

(63) Continuation of application No. PCT/CN2021/140878, filed on Dec. 23, 2021.

(30) Foreign Application Priority Data

Dec. 23, 2020 (CN) ........................ 202011549888.6

(51) Int. Cl.
*H04W 16/10* (2009.01)
*H04L 5/00* (2006.01)
(Continued)

(52) U.S. Cl.
CPC ........... *H04W 16/10* (2013.01); *H04L 5/0053* (2013.01); *H04W 28/26* (2013.01); *H04W 72/542* (2023.01)

(58) Field of Classification Search
CPC ... H04W 16/10; H04W 28/26; H04W 72/542; H04W 72/12; H04W 16/14; H04W 16/18; H04L 5/0053; H04L 5/0062; H04L 5/0091
See application file for complete search history.

(56) References Cited

U.S. PATENT DOCUMENTS

2016/0270034 A1* 9/2016 Chai ..................... H04W 16/10
2017/0006492 A1 1/2017 Khoshnevisan et al.
2021/0218511 A1* 7/2021 Zhang ................... H04W 72/02

FOREIGN PATENT DOCUMENTS

CN 102083119 A 6/2011
CN 105681007 A 6/2016
(Continued)

OTHER PUBLICATIONS

Machine Translation of EP 3221994 B1 (Year: 2020).*
(Continued)

*Primary Examiner* — Khaled M Kassim
*Assistant Examiner* — Noah James Sugden
(74) *Attorney, Agent, or Firm* — HAUPTMAN HAM, LLP

(57) ABSTRACT

The present application relates to the technical field of communications, and in particular to a method for scheduling spectrum resources and a storage medium. The method for scheduling spectrum resources includes: obtaining a grid according to dividing a cell in a network, each grid corresponding to one resource block or one resource block group; obtaining offline feature data; performing an interference mark on the grid according to the offline feature data, to obtain a mark model; and scheduling spectrum resources according to the mark model.

15 Claims, 9 Drawing Sheets

(51) Int. Cl.
*H04W 28/26* (2009.01)
*H04W 72/542* (2023.01)

(56) References Cited

FOREIGN PATENT DOCUMENTS

| | | | | |
|---|---|---|---|---|
| CN | 106572540 | B | 4/2020 | |
| EP | 3221994 | B1 * | 3/2020 | ............ H04J 11/003 |
| WO | 2016172972 | A1 | 11/2016 | |
| WO | 2017124323 | A1 | 7/2017 | |

OTHER PUBLICATIONS

Extended Search Report in Corresponding European Application No. 21909526.2, mailed May 3, 2024; 10 pgs.
International Search Report and Written Opinion issued in International Application No. PCT/CN2021/140878; mailed Mar. 22, 2022; 12 pgs.

* cited by examiner

METHOD FOR SCHEDULING SPECTRUM RESOURCE AND STORAGE MEDIUM

CROSS-REFERENCE TO RELATED APPLICATIONS

This application is a continuation application of International Application No. PCT/CN2021/140878, filed on Dec. 23, 2021, which claims priority to Chinese Patent Application No. 202011549888.6, filed on Dec. 23, 2020. The disclosures of the above-mentioned applications are incorporated herein by reference in their entireties.

TECHNICAL FIELD

The embodiments of the present application relate to the technical field of communications, and in particular to a method for scheduling spectrum resources and a storage medium.

BACKGROUND

Spectrum resources are the foundation of the wireless communication technology, and continuously improving the spectrum efficiency is the core driving force for the development of the wireless communication technology. To improve the spectrum efficiency, a flexible and effective method for scheduling spectrum resources must be adopted when the spectrum resources are limited. However, the conventional method for scheduling spectrum resources lacks flexibility, and the spectrum utilization rate is low. Especially, when two spectrums are overlapped, based on the conventional method for scheduling fixed spectrum resources, the user rate and user experience cannot be optimal due to interference from adjacent cells. Therefore, on the one hand, the inter-cell interference coordination (ICIC) is proposed by the long term evolution (LTE) system to solve interference problems in the spectrum scheduling process. That is, through the X2 interface, the scheduling frequency and the transmitting power of users in the cell can be periodically coordinated among cells, thereby reducing interference from users in the edge of the cell. On the other hand, the new radio (NR) system proposes that the user equipment (UE) can be provided with a channel state information-reference signal (CSI-RS), to detect the channel state. Then the channel state of each UE can be obtained by the base station according to the measurement results reported by the UE, thereby scheduling the spectrum for the UE and reducing interference among users in the cell.

However, on the one hand, cells of the LTE system are substantially full covered. In a scenario of deploying 5G base stations, not only users in the edge of the 5G cell will be interfered by the LTE, but also users in the center of the 5G cell will be interfered by the LTE. For users in the center of the 5G cell, not only the income of the ICIC technology is small, but also the interaction among cells is frequent and the interaction information amount is large during the spectrum scheduling process. For the same system, when the coverage overlaps, the changing period is small, and the ICIC period is also small. Only in this case, this problem can be effectively solved. But the acceleration of the period will lead to a frequent information interaction among cells and a large interaction information amount during the spectrum scheduling process. On the other hand, when the user number of cells in the NR system increases and the system bandwidth is wide, obtaining the channel state according to the measurement results reported by the UE will cost more time-frequency domain resources to send CSI-RS resources. In this case, time-frequency domain resources that can be scheduled in the system will be reduced, and the system efficiency will be lowed. Therefore, even if the ICIC technology or the CSI-RS technology are adopted during the spectrum scheduling process, problems still exist that the interference interaction information amount among cells is large and the resource consumption is high.

SUMMARY

Embodiments of the present application provide a method for scheduling spectrum resources, including following operations: obtaining a grid according to dividing a cell in a network, each grid corresponds to one resource block (RB) or one resource block group (RBG); obtaining offline feature data; performing an interference mark on the grid according to the offline feature data, to obtain a mark model; and scheduling spectrum resources according to the mark model.

Embodiments of the present application further provide a computer-readable storage medium. A computer program is stored in the computer-readable storage medium, and when the computer program is executed by a processor, the method for scheduling spectrum resources as mentioned above is implemented.

BRIEF DESCRIPTION OF THE DRAWINGS

One or more embodiments are exemplified by pictures in the accompanying drawings, and these exemplifications are not intended to limit the embodiments.

DETAILED DESCRIPTION OF THE EMBODIMENTS

In order to make the objectives, technical solutions and advantages of the embodiments of the present application clearer, each embodiment of the present application will be described in detail below with reference to the accompanying drawings. However, those of ordinary skill in the art can understand that, in each embodiment of the present application, many technical details are provided for the reader to better understand the present application. However, even without these technical details and various changes and modifications based on the following embodiments, the technical solutions claimed in the present application can be realized. The following divisions of the various embodiments are for the convenience of description, and should not constitute any limitation on the specific implementation of the present application, and the various embodiments may be combined with each other and referred to each other on the premise of not contradicting each other.

Embodiments in the present application provide a method for scheduling spectrum resources and a storage medium, which not only can reduce the interaction information amount in inter-base-station interference coordination, but also can save resource consumption during the scheduling process.

In the embodiments of the present application, the cell in the network can be divided, and the grid can be obtained. Each grid corresponds to one resource block (RB) or one resource block group (RBG). Then the offline feature data can be obtained, and the interference mark of the grid can be obtained according to the offline feature data to obtain the offline mark model. Applying the mark model directly, and scheduling spectrum resources according to the interference mark of the grid obtained through the mark model, thereby avoiding that the state and interference coordination of spectrum resources are obtained by a large interaction in real time, reducing the interaction information amount in inter-base-station interference coordination during the scheduling process, and saving resource consumption.

Figure 1:
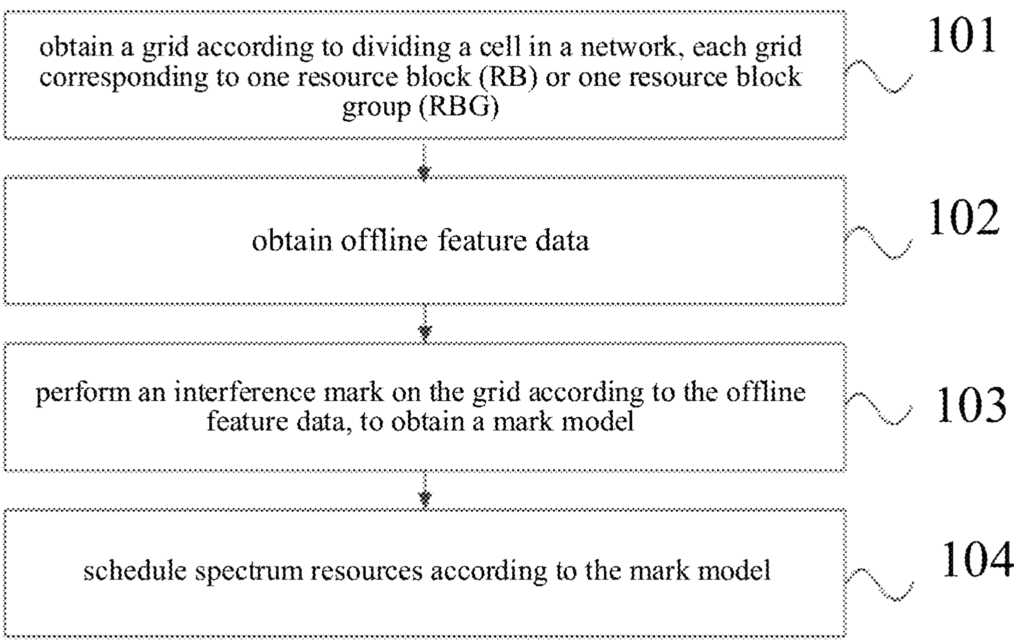
FIG. 1 is a flowchart of a method for scheduling spectrum resources according to a first embodiment of the present application.

A first embodiment of the present application relates to a method for scheduling spectrum resources. As shown in FIG. 1, the method for scheduling spectrum resources includes following operations.

Operation 101, obtaining a grid according to dividing a cell in a network, each grid corresponding to one RB or one RBG.

In operation 101 of this embodiment, there are two divisions. The cell is divided in the first division to obtain the logical location, and the spectrum resources of each logical location are divided in the second division to obtain the grid.

The operation of dividing the cell and obtaining the logical location can be implemented by two ways, to divided cells in the network.

The first way is to divide cells according to horizontal beams and path loss levels.

Figure 2:
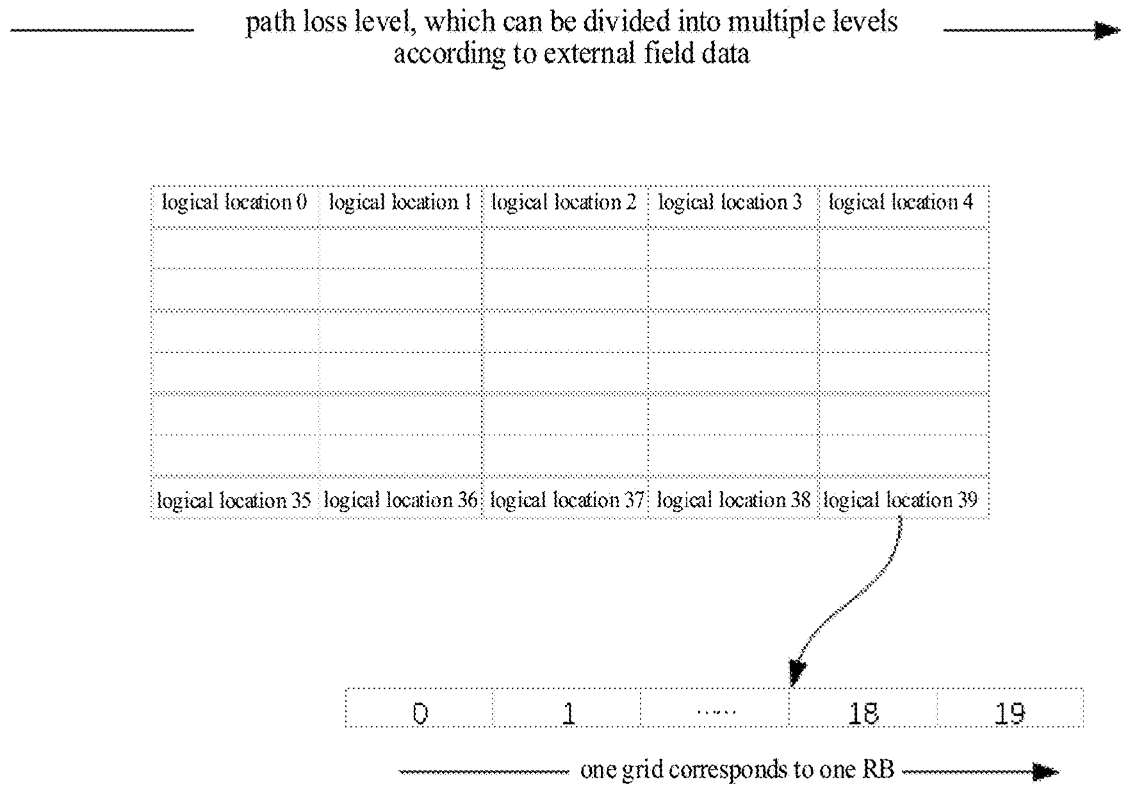
FIG. 2 is a first schematic diagram showing cells divided in operation 101 of the method for scheduling spectrum resources according to the first embodiment of the present application.

As shown in FIG. 2, the horizontal beam and the path loss level are used as a horizontal axis and a vertical axes respectively, to divide the cell. Different logical locations correspond to different path loss data and beam information.

The other way is to divide cells according to horizontal beams and vertical beams.

Figure 3:
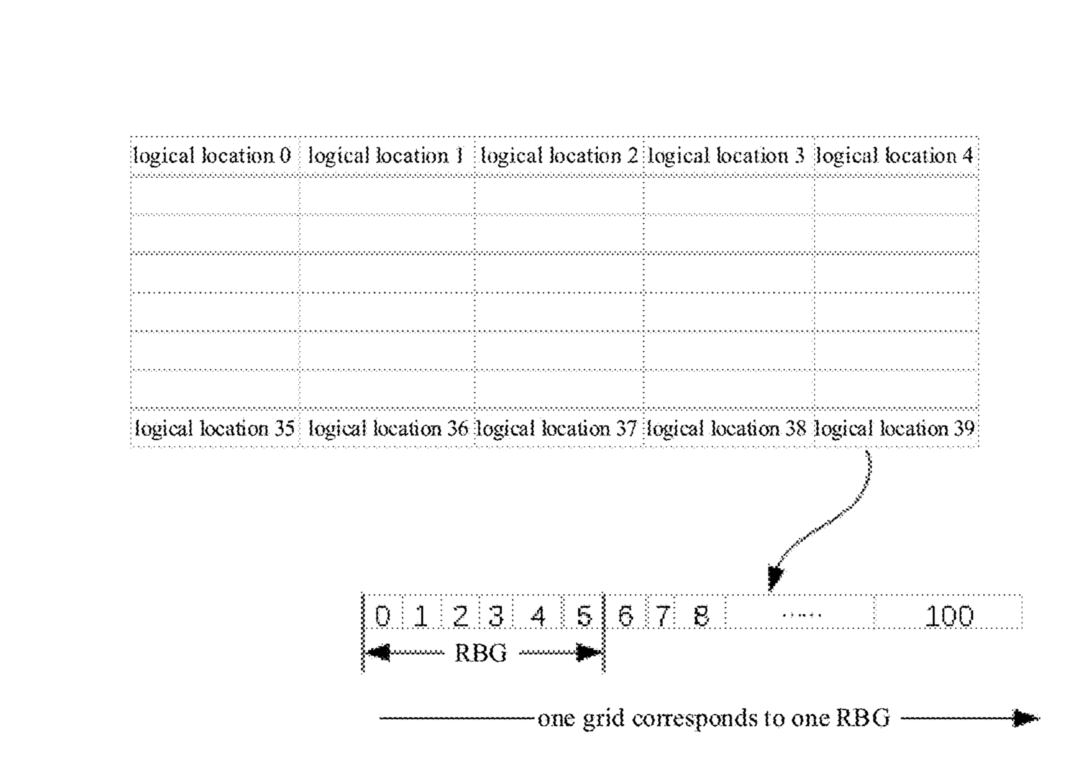
FIG. 3 is a second schematic diagram showing cells divided in operation 101 of the method for scheduling spectrum resources according to the first embodiment of the present application.

As shown in FIG. 3, the horizontal beam and the vertical beam are used as the horizontal axis and the vertical axis respectively, to divide the cell. Different logical locations correspond to different horizontal beam information and vertical beam information.

Then, the spectrum resources of the logical location are divided. After the division for spectrum resources, the spectrum resource unit includes two types: the RB and the RBG. The way to divide the spectrum resources into the RB and/or the RBG can be carried out according to factors such as the overlapping size of the spectrum and the time varying nature of the channel. Each logical location can be flexibly divided according to the current environment of the logical location. The division for spectrum resources corresponding to different logical locations can be different. For example, when continuous RBs at a certain logical location are interfered heavily, these continuous RBs corresponding to the logical location can be regarded as one RBG, and other spectrum resources are divided into multiple single RBs. Moreover, communication users corresponding to the logical location are not a certain user, but a type of user group with same features (the beam information and/or path loss levels within the same scope).

The above two ways are only examples. In the actual implement process, operation 101 can divide the cells in the network in other ways, which will not be repeated herein.

Operation 102, obtaining offline feature data.

Specifically, obtaining historical feature data scheduled by multiple users in the network. The historical feature data includes path loss data, beam information, transmission modes, A/N information, resource information, a channel quality indication (CQI), a modulation coding scheme (MCS), rank indicator (RI), and the like. Of course, the above is only a specific example. In the actual implement process, the historical feature data may include other data, which will not be repeated herein.

Operation 103, performing an interference mark on the grid according to the offline feature data, to obtain a mark model.

Figure 4:
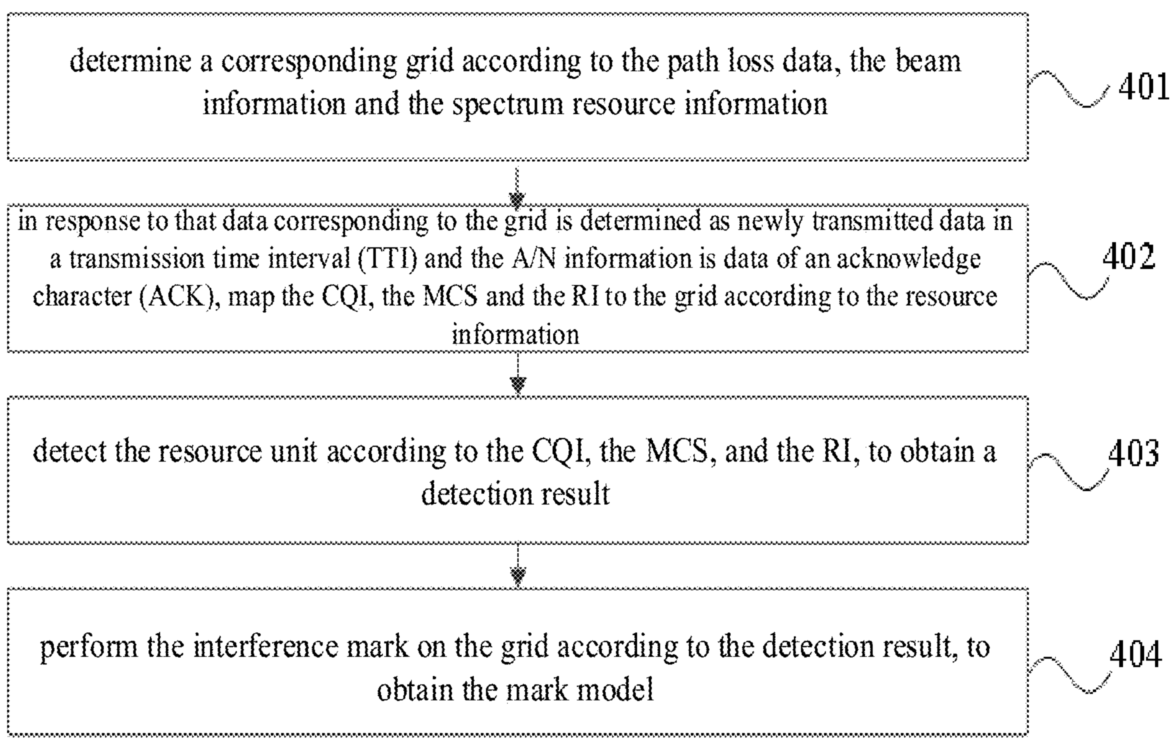
FIG. 4 is a flowchart of operation 103 of the method for scheduling spectrum resources according to the first embodiment of the present application.

As shown in FIG. 4, operation 103 can include:

operation 401, determining a corresponding grid according to the path loss data, the beam information and the spectrum resource information.

If the cell is divided according to path loss levels and horizontal beams, mapping according to the path loss data and the horizontal beam information in the beam information, and determining the corresponding logical location.

If the cell is divided according to vertical beams and horizontal beams, mapping according to the horizontal beam information and the vertical beam information in the beam information, and determining the corresponding logical location. After obtaining the logical location, obtaining the service condition of spectrum resources according to the spectrum resource information, and determining the actual use grid during communication.

It should be noted that the process in operation 401 can also be regarded as a process that mapping the user into the grid. That is, determining the grid corresponding to the user according to the path loss data and/or the beam information in the historical feature data of the user. Until a certain change occurs in the path loss level or the optimal beam of a certain user, the grid corresponding to the user will change.

Operation 402, in response to that data corresponding to the grid is determined as newly transmitted data in a transmission time interval (TTI) and the A/N information is data of an acknowledge character (ACK), mapping the CQI, the MCS and the RI to the grid according to the resource information.

Specifically, the data can be divided into newly transmitted data and re-transmitted data. In operation 402, only the newly transmitted data that has received the ACK can be regarded as available data, then determining the scheduled grid in the TTI according to the resource information, and mapping the CQI, the MCS and the RI of the available data in this scheduling process to the corresponding grid.

Operation 403, detecting the grid according to the CQI, the MCS, and the RI, to obtain a detection result.

In this embodiment, operation 403 can be carried out in two ways to detect the grid and obtain the detection result.

In the first way, a comparison is made with the ideal data.

If the ideal external field data without interference or simulation data can be obtained as the standard data, according to the data mapped in operation 402, the CQI data, the MCS data, and the RI data of each grid can be learned to obtain the CQI-MCS-RI curve corresponding the grid. Then comparing the CQI-MCS-RI curve with the ideal data to detect whether the grid is interfered, thereby a detection result of each grid can be obtained.

The other way is to make a statistic on existing data.

If the ideal simulation data cannot be obtained, the RI data of CQI and MCS on each grid can be used to count parameters differences, thereby obtaining the relative interference degree of each grid, and obtaining the RB detection result in each grid.

It should be noted that when the above way is used for marking, if the grid corresponds to the RBG, then when the number of RBs interfered in the RBG reaches preset conditions such as a certain number or proportion, it is determined that the RBG is interfered.

The above two ways are only specific examples. In the actual implement process, operation 403 can detect the grids in other ways, which will not be repeated herein.

By making a comparison with the ideal data or making a statistic on the existing data to detect the grid, the detection ways are various, and the interference detection can be applied in different scenarios, so that the technical solutions in the embodiment of the present application are more applicable.

Operation 404, performing the interference mark on the grid according to the detection result, to obtain the mark model.

If the detection result of a certain grid indicates an interference or an great interfered, an interference tag can be added to the grid. If the detection result of a certain grid indicates no interference or a slight interference, a un-interference tag can be added to the grid, and all tags can be counted and recorded to obtain the mark models.

Operation 104, scheduling spectrum resources according to the mark model.

It can be determined that the user in the logical location may schedule which grid according to the mark model. Three cases in the following may exist.

In the first case, the grid mark in the corresponding logical location indicates no interference or a slight interference, then the interference degree at this logical location is substantially the same, and the full bandwidth of this user is available.

In the second case, grids in the corresponding logical location are interfered, but the number of interfered grids is small and the distance between each other is large. In this case, the user should try to stagger the grid with the interference mark when scheduling and allocating grids. If the grid with the interference mark cannot be avoided, scheduling as few grids as possible the grid with the interference mark.

In the third case, if grids in the corresponding logical location are interfered, and the number of the interfered grids is large and continuous grids are interfered, then the base station needs to allocate these grids to the user in the logical location with less interference for scheduling. If the allocation cannot be performed, the allocation of user scheduling at this logical location can be conservative. That is, if the load of the base station is heavy, only when the grid with great interference is available at the logical location, conservative scheduling can be performed for scheduling MCS and RI to ensure the normal operation of the service in the scheduling process of the current user grid. For example, performing a conservative 3rd order on the basis of the original MCS, or using a fixed MCS and RI for a conservative scheduling.

In the embodiment of the present application, the cell in the network can be divided, and the grid can be obtained. Each grid corresponds to at least one RB or at least one RBG. Then the offline feature data can be obtained, and the interference mark of the grid can be obtained according to the offline feature data to obtain the offline mark model. Applying the mark model directly, and scheduling spectrum resources according to the interference mark of the grid obtained through the mark model, thereby avoiding that the state and interference coordination of spectrum resources are obtained by a large interaction in real time, reducing the interaction information amount in inter-base-station interference coordination during the scheduling process, and saving resource consumption.

Figure 5:
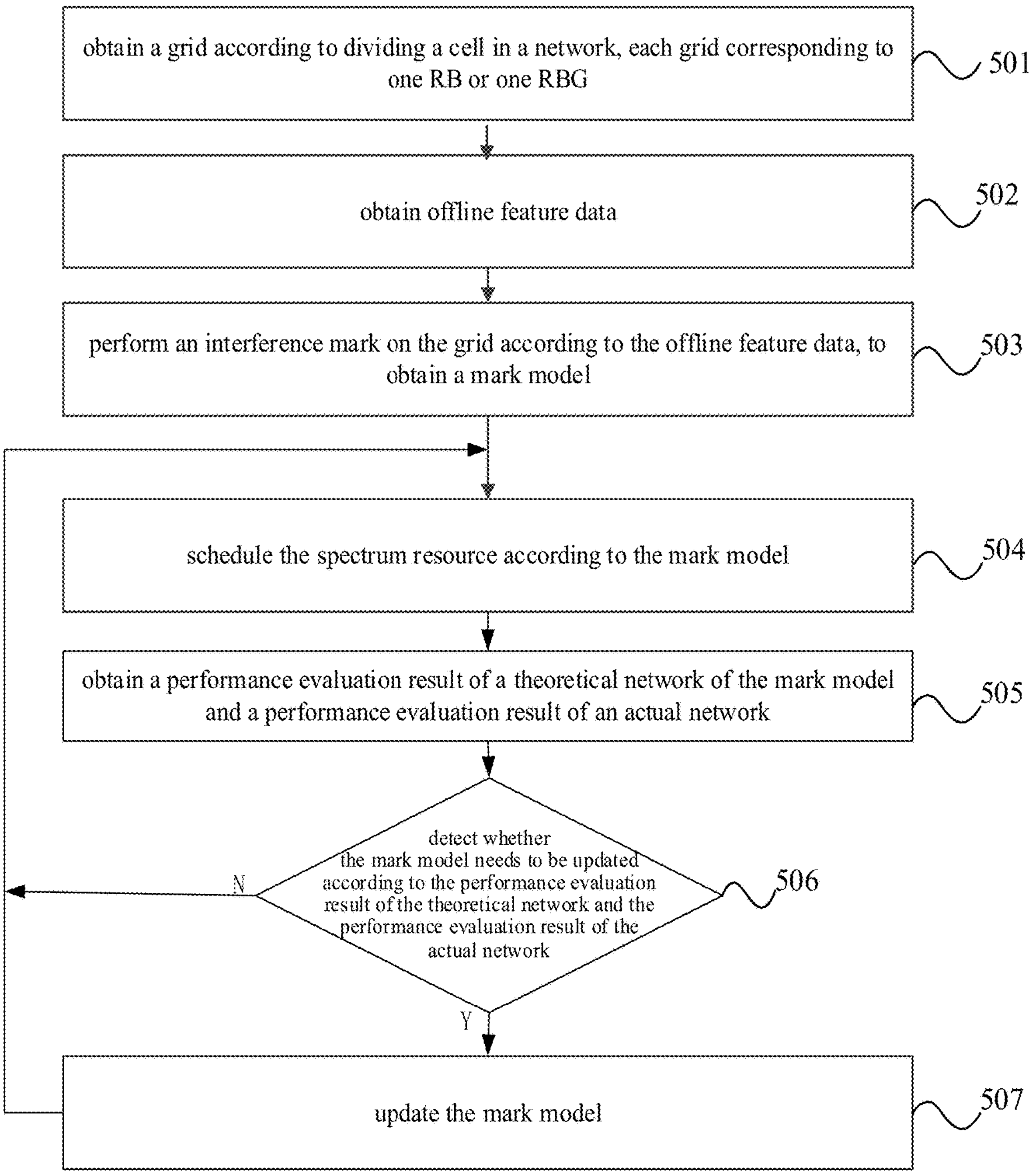
FIG. 5 is a flowchart of the method for scheduling spectrum resources according to a second embodiment of the present application.

A second embodiment of the present application relates a method for scheduling spectrum resources. The embodiments are substantially the same as the first embodiment. The difference is that the mark model will be updated. The specific process is shown in FIG. 5.

Operation 501, obtaining a grid according to dividing a cell in a network, each grid corresponding to one RB or one RBG.

Operation 501 in this embodiment is substantially the same as operation 101 in the first embodiment, which will not be repeated here.

Operation 502, obtaining offline feature data.

Operation 502 in this embodiment is substantially the same as operation 102 in the first embodiment, which will not be repeated here.

Operation 503, performing an interference mark on the grid according to the offline feature data, to obtain a mark model.

Operation 503 in this embodiment is substantially the same as operation 103 in the first embodiment, which will not be repeated here.

Operation 504, scheduling spectrum resources according to the mark model.

Operation 504 in this embodiment is substantially the same as operation 104 in the first embodiment, which will not be repeated here.

Operation 505, obtaining a performance evaluation result of a theoretical network of the mark model and a performance evaluation result of an actual network.

The network performance evaluation results are based on the cell spectrum efficiency, the user-level block error ratio (BLER) and other evaluation results.

Operation 506, detecting whether the mark model needs to be updated according to the performance evaluation result of the theoretical network and the performance evaluation result of the actual network.

If the mark model needs to be updated, executing operation 507. If the mark model does not need to be updated, executing operation 504.

Operation 507, updating the mark model.

Figure 6:
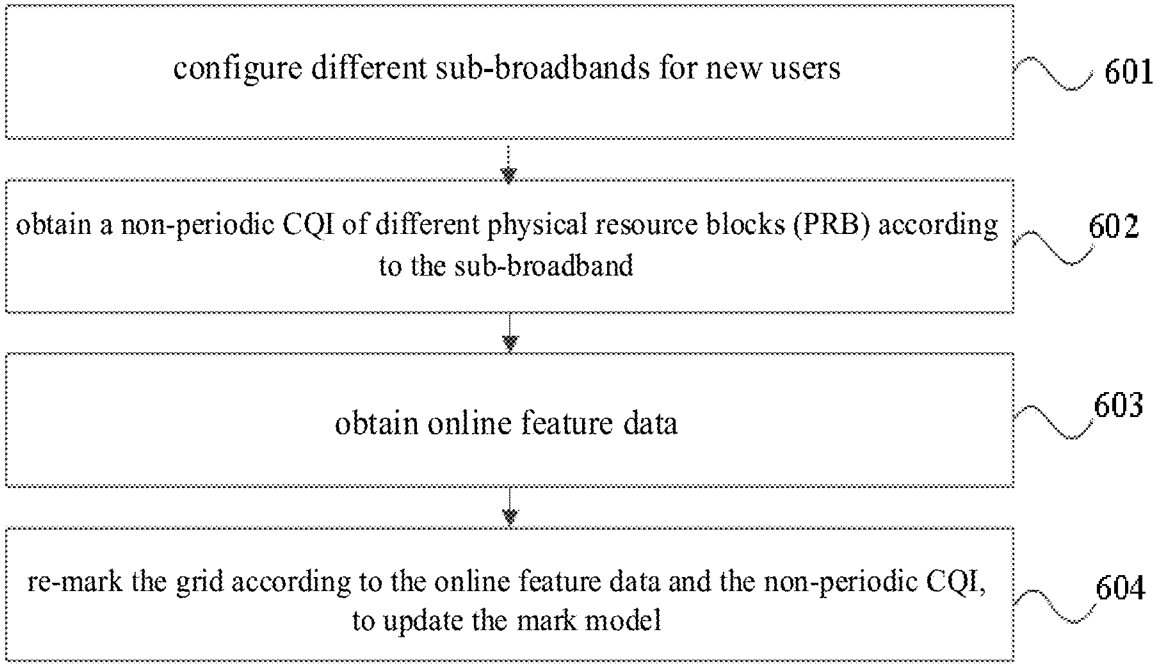
FIG. 6 is a flowchart of operation 507 of the method for scheduling spectrum resources according to the second embodiment of the present application.

As shown in FIG. 6, operation 507 can include:

operation 601, configuring different sub-broadbands for new users.

Specifically, no intersected sub-broadband interval exists in the sub-broadband after the original broadband is divided.

Further, if there is a grid corresponding to M newly accessed users, when the configured bandwidth is in a range of 0-99 PRB, configuring sub-broadbands for the M users. For example, configuring the first user 0-9PRB sub-broadbands, and configuring the second user 10-19PRB sub-broadbands.

Operation 602, obtaining a non-periodic CQI of different physical resource blocks (PRB) according to the sub-broadband.

Operation 601 is combined with operation 602, if there is a grid corresponding to M newly accessed users, when the configured bandwidth is in range of 0-99 PRB, configuring sub-broadbands for the M users, and the sub-broadband is used for measuring non-periodic CQI of different PB. For example, the first user measures and reports the sub-broadband CQI of 0-9PRB, and the second user measures and reports the sub-broadband CQI of 10-19PRB, thereby obtaining each sub-broadband CQI corresponding to the broadband of each grid.

Operation 603, obtaining online feature data.

The feature data scheduled by multiple users in the network is obtained online. The scheduled feature data includes path loss data, beam information, transmission modes, A/N information, resource information, a CQI, a MCS, and a RI, and the like. Of course, the above are only specific examples. In the actual implement process, the scheduling feature data may include other data, which will not be repeated here.

Operation 604, re-marking the grid according to the online feature data and the non-periodic CQI, to update the mark model.

Specifically, calculating the average and variance of each sub-broadband CQI, counting the sub-broadband whose sub-broadband CQI is less than the average, and determining whether the corresponding variance is greater than the threshold. If the variance is greater than the threshold, determining that the sub-broadband is interfered in a relative great degree and the sub-broadband tag indicates an interference. Updating the MC SRI and the A/N information corresponding to the grid according to the online feature data, and performing interference mark on the grid according to the updated MCS, updated RI, and updated A/N information (the process of performing interference mark is substantially the same as operation 103 in the first embodiment, which will not be repeated here). Obtaining the heuristic tag, and detecting whether the heuristic tag is reliable according to the verification tag. If the heuristic tag is reliable, updating the heuristic tag to the mark model, to obtain the updated mark model. Further, detecting whether the heuristic tag is reliable includes the following situations.

If the heuristic tag of the sub-broadband indicates that the sub-broadband is interfered, and the proportion of the grids without interference in the sub-broadband is greater than the threshold, such as 50%, the grid in the sub-broadband needs to continue to obtain the heuristic tag based on the online feature data, and configure non-periodic CQI for reporting.

If the heuristic tag of the sub-broadband indicates that the sub-broadband is not interfered, and the proportion of the interfered grid in the sub-broadband is more than 50% (as mentioned above), the grid in the sub-broadband needs to continue to obtain online feature data, the heuristic tag, and configure non-periodic CQI for reporting.

If the heuristic tag of the sub-broadband indicates that the sub-broadband is interfered, and the proportion of the interfered grid in the sub-broadband is more than 50% (as mentioned above) and the grid are continuous, updating the heuristic tag of the grid to the actual tag, which will no longer obtain heuristic tags according to the online feature data.

If the heuristic tag of the sub-broadband indicates that the sub-broadband is not interfered, and the proportion of the grid without interference in the sub-broadband is more than 50% (as mentioned above) and the grids are continuous, updating the heuristic tag of the grid to the actual tag, which will no longer obtain heuristic tags according to the online feature data.

Based on the first embodiment, in this embodiment, heuristics can be performed between frequency bands through obtained online feature data, and the model can be modified adaptively based on the sub-broadband CQI, to match the model with the cell environment better.

In order to enable those skilled in the art to understand the overall process of the method for scheduling spectrum resources in the first implementation of the present application, the third to the fifth embodiments of the present application will use the specific application scenarios as examples for description in the following.

Figure 7:
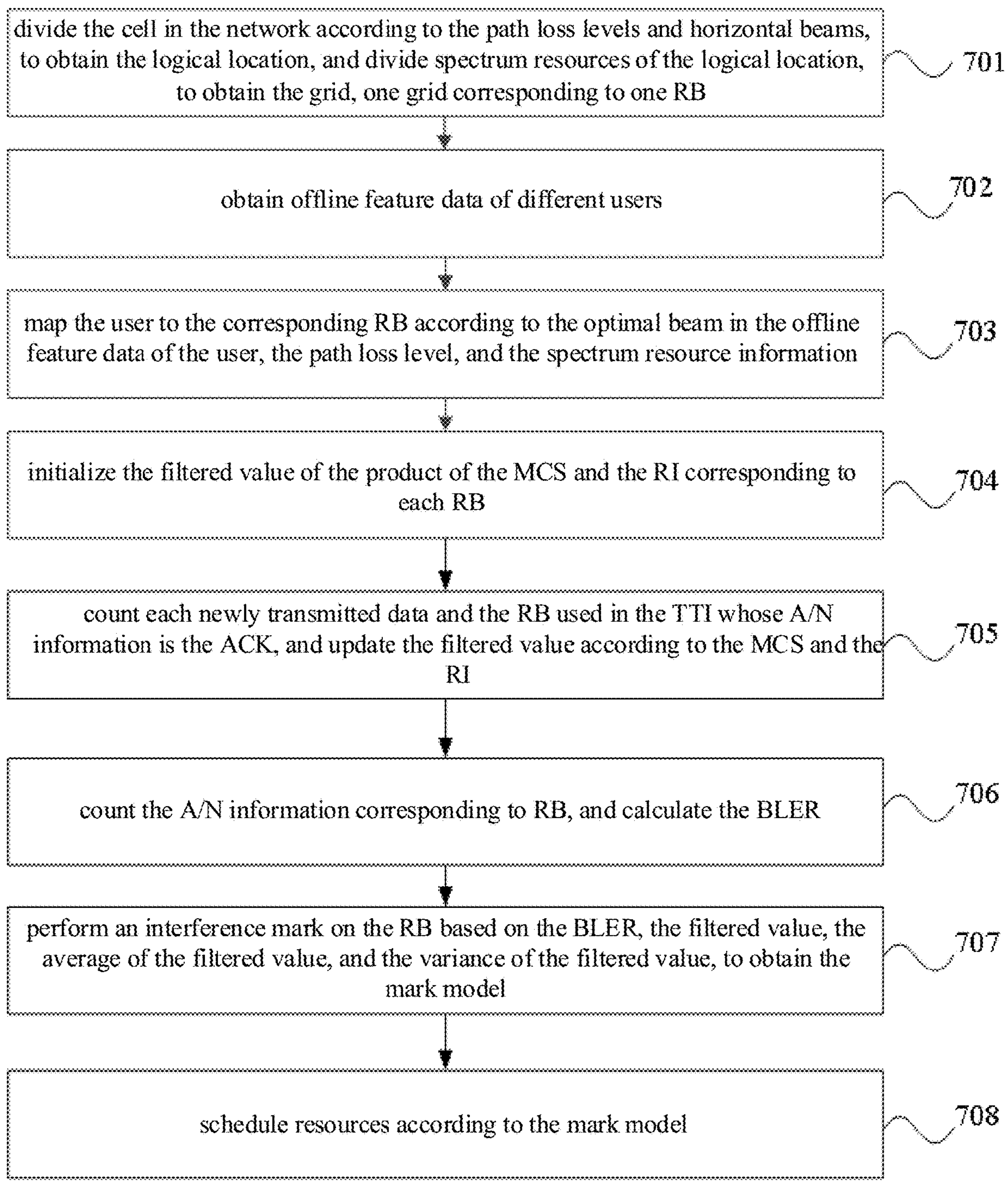
FIG. 7 is a flowchart of the method for scheduling spectrum resources according to a third embodiment of the present application.

A third embodiment of the present application relates a method for scheduling spectrum resources. In this embodiment, the cell is divided according to the path loss level and horizontal beams, and the RBG is not used. In addition, the system broadband is 100 RB. Taking the RB marked by statistics as an example. As shown in FIG. 7, the method for scheduling spectrum resources including following operations.

Operation 701, dividing the cell in the network according to the path loss levels and horizontal beams, to obtain the logical location, and dividing the spectrum resources of the logical location, to obtain the grid, a grid corresponding to one RB.

The path loss level is divided according to the scope of the path loss, and the logic distance between the user equipment (UE) and the base station is divided into 5 types: a very close point, a near point, a middle point, a far point, and a very far point. The direction of the UE relative to the base station is determined according to the optimal beam of the UE. The specific number of beams depends on the base station. The maximum beam of the new radio (NR) system at low frequency can be configured with 8 beams. Therefore, the logical location number can be divided to 5*8=40 according to the above number of beams and the path loss level. A logical location corresponds to 100 RBs.

Operation 702, obtaining offline feature data of different users.

Operation 703, mapping the user to the corresponding RB according to the optimal beam in the offline feature data of the user, the path loss level, and the spectrum resource information.

Operation 704, initializing the filtered value of the product of the MCS and the RI corresponding to each RB.

Specifically, setting the filtered value RB_mcsri_value_i=0.

Operation 705, counting each newly transmitted data and the RB used in the TTI whose A/N information is the ACK, and updating the filtered value according to the MCS and the RI.

Specifically, if the i-th RB is scheduled in a certain TTI, updating the filtered value through the MCS and RI information of this TTI according to the following formula.

$$\mathrm{RB\_}mcsri\mathrm{\_value\_}i=\alpha*mcs*ri+(1-\alpha)*\mathrm{RB\_}mcsri\mathrm{\_value\_}i_{History}$$

For the first TTI, RB_mcsri_value_i=mcs*ri, α is a parameter. MCS and RI are MCS data and RI data in the TTI. $\mathrm{RB\_mcsri\_value\_i}_{History}$ is the filtered value before updating.

Operation 706, counting the A/N information corresponding to RB, and calculating the BLER.

Specifically, counting the A/N information of the TTI in each newly transmitted data, and calculating the BLER of the RB in the TTI scheduling process on this basis. Further, if a certain TTI schedules the i-th RB, counting the A/N information of the TTI on the corresponding RB. If the sample amount of the A/N information of the RB is lower than a certain threshold, this mark is an invalid mark, which will be recorded as NULL. Continuously executing operation 706 until all RBs in the grid have valid marks.

Operation 707, performing an interference mark on the RB based on the BLER, the filtered value, the average of the filtered value, and the variance of the filtered value, and obtaining the mark model.

Specifically, obtaining the average Ave_RB_mcsri_value and the variance Var_RB_i_mcsri_value of all RBs in the logical location, and marking them according to the following rules.

If RB_mcsri_value_i is greater than or equal to Ave_RB_mcsri_value, and $BLER_{Grid}$<Grid_BLER_THR0, it means that the interference tag is 0, and the interference degree is low.

If RB_mcsri_value_i is less than Ave_RB_mcsri_value, 0≤$BLER_{Grid}$<Grid_BLER_THR1 Var_RB_mcsri_value≤RB_MCSRI_Var_Thr1, it means that the interference tag is 0.

If RB_mcsri_value_i is less than Ave_RB_mcsri_value, 0≤$BLER_{Grid}$<Grid_BLER_THR1, Var_RB_mcsri_value>RB_MCSRI_Var_Thr1, it means that the interference tag is 1, and the interference degree is great, indicating that the user in this logical location is not recommended to use the RB.

If RB_mcsri_value_i is less than Ave_RB_mcsri_value, Grid_BLER_THR1<$BLER_{Grid}$≤Grid_BLER_THR2, Var_RB_mcsri_value≤RB_MCSRI_Var_Thr2, it means that the interference tag is 0.

If RB_mcsri_value_i is less than Ave_RB_mcsri_value, Grid_BLER_THR1<$BLER_{Grid}$≤Grid_BLER_THR2, Var_RB_mcsri_value>RB_MCSRI_Var_Thr2, it means that the interference tag is 1.

It should be noted that RB_mcsri_value_i is the filtered value of a certain RB, and $BLER_{Grid}$ is the BLER of the RB. Grid_BLER_THR0, Grid_BLER_THR1, Grid_BLER_THR2, and RB_MCSRI_Var_Thr2 are preset thresholds.

Operation 708, scheduling resources according to the mark model.

Operation 708 in this embodiment is substantially the same as operation 104 in the first embodiment, which will not be repeated herein.

In the embodiments of the present application, the cell in the network can be divided, and the grid can be obtained. Each grid corresponds to one RB. Then the offline feature data can be obtained, and the interference mark of the grid can be obtained according to the offline feature data to obtain the offline mark model. Applying the mark model directly, and scheduling spectrum resources according to the interference mark of the grid obtained through the mark model, thereby avoiding that the state and interference coordination of spectrum resources are obtained by a large interaction in real time, reducing the interaction information amount in inter-base-station interference coordination during the scheduling process, and saving resource consumption.

Figure 8:
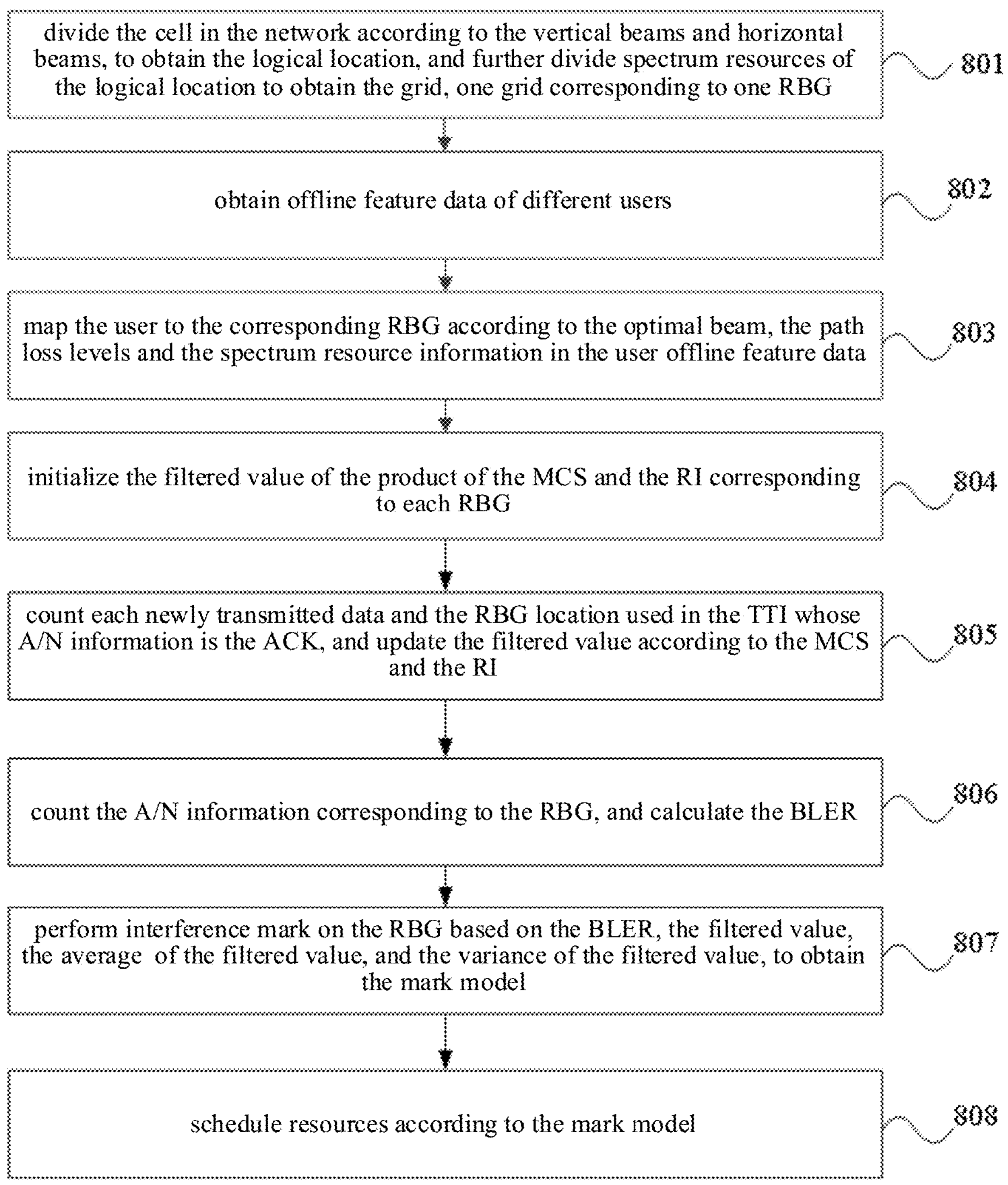
FIG. 8 is a flowchart of the method for scheduling spectrum resources according to a fourth embodiment of the present application.

A fourth embodiment of the present application relates to a method for scheduling spectrum resources. In this embodiment, the cell is divided according to vertical beams and horizontal beams, and the RBG and the system broadband with 100 RBs are adopted. The RGB is marked in a statistical manner. As shown in FIG. 8, the method for scheduling spectrum resources includes following operations.

Operation 801, dividing the cell in the network according to the vertical beams and horizontal beams, to obtain the logical location, and further dividing the spectrum resources of the logical location to obtain the grid, a grid corresponding to one RBG.

Specifically, determining the logical area of the UE relative to the base station according to vertical beams and horizontal beams, and dividing 3*8=24 logical locations. Dividing RBs that may be interfered in known adjacent cells into one RBG. Dividing RBs without interference into one RBG. For example, if 100 RBs have the full bandwidth, and 0-19 RBs may be interfered by LTE F1, recording this RBG as F1RBG. If 80-99 RBs are interfered by LTE F2, recording this RBG as F1RB, and recording this RBG as F2RBG. If 20-79 RBs are not interfered from the LTE frequency band, recording this RBG as F RBG. Each logical location corresponds to 3 RBGs.

Operation 802, obtaining offline feature data of different users.

Operation 803, mapping the user to the corresponding RBG according to the optimal beam, the path loss levels and the spectrum resource information in the user offline feature data.

Operation 804, initializing the filtered value of the product of the MCS and the RI corresponding to each RBG.

Specifically, setting the filtered value RBG_mcsri_value=0.

Operation 805, counting each newly transmitted data and the RBG location used in the TTI whose A/N information is the ACK, and updating the filtered value according to the MCS and the RI.

Specifically, if the i-th RBG is scheduled in a certain TTI, using the MCS and RI information in the TTI to update the filtered value according to the following formula.

$$RBG\_Fi\_mcsri\_value=\alpha*mcs*ri+(1-\alpha)*RBG\_Fi\_mcsri\_value_{History}$$

The first TTI is RB_mcsri_value_i=mcs*ri, and α is a parameter. mcs and ri are the MCS data and the RI data in the TTI. $RB\_mcsri\_value\_i_{History}$ is the filtered value before updating.

Further, following cases may exist.

For the TTI which has scheduled two RBGs of F1 and F RBG, determining whether to update two RBGs of F1 and F, and recording the number of RBs that occupies F1RBG is x, and the number of RBs of F RBG is y. When x/(x+y) is more than a certain proportion, updating F1. If y/(x+y) is more than a certain percentage, updating F. If the proportional factor is not exceeded, the corresponding RBG grid will not be updated. The formula for updating is as following.

$$RBG\_F1\_mcsri\_value=\alpha*mcs*ri+(1-\alpha)*RBG\_F1\_mcsri\_value_{History},$$

$$RBG\_F\_mcsri\_value=\alpha*mcs*ri+(1-\alpha)*RBG\_F\_mcsri\_value_{History},$$

RBG_F1_mcsri_value and RBG_F_mcsri_value are respectively the filtered value of F1 and F RBG. $RBG\_F1\_mcsri\_value_{History}$ and $RBG\_F\_mcsri\_value_{History}$ are respectively the filtered value of F1 and F RBG before updating, and α is a parameter.

For the TTI which has scheduled two RBGs of F2 and F RBG, updating two RBGs of F2 and F, and recording the number of RBs that occupies F2RBG is x, and the number of RBs of F RBG is y. When x/(x+y) is more than a certain proportion, updating F1. If y/(x+y) is more than a certain percentage, updating F. If the proportional factor is not exceeded, the corresponding RBG grid will not be updated. The formula for updating is as following.

$$RBG\_F2\_mcsri\_\text{value}=\alpha^*mcs^*ri+(1-\alpha)^*RBG\_F2\_mcsri\_\text{value}_{History},$$

$$RBG\_F\_mcsri\_\text{value}=\alpha^*mcs^*ri+(1-\alpha)^*RBG\_F\_mcsri\_\text{value}_{History},$$

RBG_F2_mcsri_value and RBG_F_mcsri_value are respectively the filtered value of F2 and F RBG. RBG_F2_mcsri_value$_{History}$ and RBG_F_mcsri_value$_{History}$ are respectively the filtered value of F2 and F RBG before updating, and $\alpha$ is a parameter.

For the TTI which has scheduled three RBGs of F1, F2 and F RBG, determining and updating three RBGs. Recording the number of RBs that occupies F1RBG is x, the number of RBs of F2RBG is y, and the number of RBs of F RBG is z. If x/(x+y+z) is more than a certain proportion, updating F1. If y/(x+y+z) is more than a certain percentage, updating F2. If z/(x+y+z) is more than a certain percentage, updating F2. If the proportional factor is not exceeded, the corresponding RBG grid will not be updated. The formula for updating is as following.

$$RBG\_F1\_mcsri\_\text{value}=\alpha^*mcs^*ri+(1-\alpha)^*RBG\_F1\_mcsri\_\text{value}_{History},$$

$$RBG\_F2\_mcsri\_\text{value}=\alpha^*mcs^*ri+(1-\alpha)^*RBG\_F2\_mcsri\_\text{value}_{History},$$

$$RBG\_F\_mcsri\_\text{value}=\alpha^*mcs^*ri+(1-\alpha)^*RBG\_F\_mcsri\_\text{value}_{History},$$

RBG_F1_mcsri_value, RBG_F2_mcsri_value, and RBG_F_mcsri_value are respectively the filtered value of F1, F2 and F RBG. RBG_F1_mcsri_value$_{History}$, RBG_F2_mcsri_value$_{History}$ and RBG_F_mcsri_value$_{History}$ are respectively the filtered value of F1, F2 and F RBG before updating, and $\alpha$ is a parameter.

Operation 806, counting the A/N information corresponding to the RBG, and calculating the BLER.

Specifically, counting the A/N information in the TTI in each newly transmitted data, and calculating the BLER of the RBG in the TTI scheduling on this basis. Further, if the i-th RBG is scheduled in a certain TTI, counting the A/N of the TTI on the corresponding RBG. If the sample amount of the A/N information of the RBG is lower than a certain threshold, this mark is invalid and will be recorded as NULL. Constantly executing operation 806 until all RBGs in the logical location have valid marks.

Operation 807, performing interference mark on the RBG based on the BLER, the filtered value, the average of the filtered value, and the variance of the filtered value, to obtain the mark model.

Specifically, obtaining the average Ave_RBG_mcsri_value and the variance Var_RBG_i_mcsri_value of the filtered value of all RBGs in the logical location, then marking according to the following rules.

If RBG_mcsri_value_i is greater than or equal to Ave_RBG_mcsri_value, and BLER$_{Grid}$<Grid_BLER_THR0, it means that the interference tag is 0, and the degree of interference is low.

If RBG_mcsri_value_i is less than Ave_RBG_mcsri_value, 0≤BLER$_{Grid}$<Grid_BLER_THR1, and Var_RBG_mcsri_value≤RBG_MCSRI_Var_Thr1, it means that the interference tag is 0.

If RBG_mcsri_value_i is less than Ave_RBG_mcsri_value, 0≤BLER$_{Grid}$<Grid_BLER_THR1, and Var_RBG_mcsri_value>RBG_MCSRI_Var_Thr1, it means that the interference tag is 1, and the degree of interference is great, indicating that the user in this logical location is not recommended to use the RB.

If RBG_mcsri_value_i is less than Ave_RBG_mcsri_value, 0≤Grid_BLER_THR1<BLER$_{Grid}$≤Grid_BLER_THR2, and Var_RBG_mcsri_value RBG_MCSRI_Var_Thr2, it means that the interference tag is 0.

If RBG_mcsri_value_i is less than Ave_RBG_mcsri_value, 0≤Grid_BLER_THR1<BLER$_{Grid}$≤Grid_BLER_THR2, and Var_RBG_mcsri_value>RBG_MCSRI_Var_Thr2, it means that the interference tag is 1.

It should be noted that RB_mcsri_value_i is the filtered value of a certain RBG, BLER$_{Grid}$ is the BLER of the RB. Grid_BLER_THR0, Grid_BLER_THR1, Grid_BLER_THR2, and RB_MCSRI_Var_Thr2 are preset thresholds.

Operation 808, scheduling resources according to the mark model.

Specially, following cases may exist.

If all RBGs at the logical location of the user are marked 0, the RB that can be used by users has a full bandwidth.

If RBG at the logical location of the user is marked 1, the user should stagger the RBG marked as 1 when scheduling and allocating the RB. If the RBG marked as 1 cannot be staggered, scheduling the RB of the RBG marked as 1 in the grid as less as possible.

If there are continuous RBGs marked as 1 in the grid where the user is located, the base station needs to allocate these RBGs to the user scheduling in the grid whose RBG is marked as 0 as much as possible. If these RBGs cannot be allocated, the allocation for the RBG of the user scheduling at this logical location can be conservative.

In the embodiment of the present application, the cell in the network can be divided, and the grid can be obtained. Each grid corresponds to one RBG. Then the offline feature data can be obtained, and the interference mark of the grid can be obtained according to the offline feature data to obtain the offline mark model. Applying the mark model directly, and scheduling spectrum resources according to the interference mark of the grid obtained through the mark model, thereby avoiding that the state and interference coordination of spectrum resources are obtained by a large interaction in real time, reducing the interaction information amount in inter-base-station interference coordination during the scheduling process, and saving resource consumption.

Figure 9:
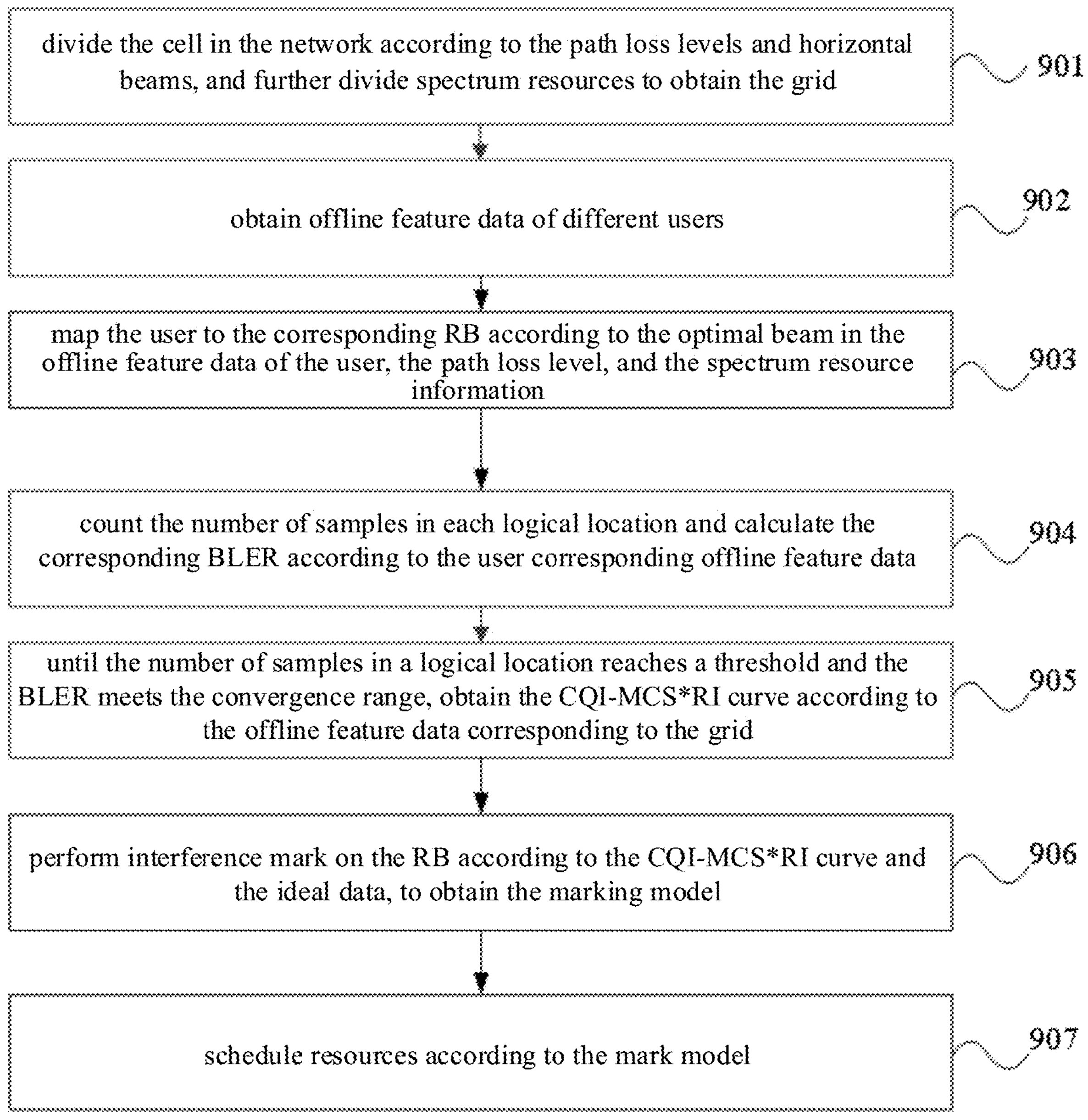
FIG. 9 is a flowchart of the method for scheduling spectrum resources according to a fifth embodiment of the present application.

A fifth embodiment of the present application relates a method for scheduling spectrum resources. In this embodiment, a comparison is made with the ideal data, and the grids all correspond to the RBs as an example. As shown in FIG. 9, the method for scheduling spectrum resources includes following operations.

Operation 901, dividing the cell in the network according to the path loss levels and horizontal beams, and further dividing the spectrum resources to obtain the grid.

Specifically, the path loss level is divided according to the scope of the path loss, and the logic distance between the UE and the base station is divided into 5 types: a very close point, a near point, a middle point, a far point, and a very far point. Determining the direction of the UE relative to the base station according to the optimal beam of the UE. The specific number of beams depends on the base station. The maximum low-frequency beam of the NR system can be configured with 8 beams. Therefore, the logical location number can be divided to 5*8=40 according to the above number of beams and the path loss level. A logical location corresponds to 100 RBs.

Operation 902, obtaining offline feature data of different users.

Operation 903, mapping the user to the corresponding RB according to the optimal beam in the offline feature data of the user, the path loss level, and the spectrum resource information.

Operation 904, counting the number of samples in each logical location and calculating the corresponding BLER according to the user corresponding offline feature data.

It should be noted that the operation of calculating the BLER in this embodiment is substantially the same as the third embodiment, which will not be repeated here.

Operation 905, until the number of samples in a logical location reaches a threshold and the BLER meets the convergence range, obtaining the CQI-MCS*RI curve according to the offline feature data corresponding to the grid.

Specifically, counting the MCS and the RI of the TTI, whose A/N information is the ACK through the newly transmitted data of the user in the TTI. Further, counting the corresponding CQI of the current TTI. Mapping the MCS*RI value to the corresponding RB, and then obtaining the CQI-MCS*RI curve. If no CQIs exists in the grid, the corresponding RB will be marked as invalid. If an invalid RB is mapped in the applying process, the feature can be learned online. If there is a differentiation of MCS*RI under the same RB in the logical position, the corresponding actual value can be converted according to the ratio or other methods.

Operation 906, performing interference mark on the RB according to the CQI-MCS*RI curve and the ideal data, to obtain the marking model.

Specifically, the ideal data is the CQI-MCS*RI curve corresponding to each logical location in the cell without interference, and is obtained from the outer field or laboratory simulation. The CQI-MCS*RI curve obtained in operation 905 is the actual data. Following cases may exist.

If the actual data is greater than or equal to the theoretical data on the promise that the same CQI is at the logical location, a certain RB in the logical location is not interfered and can be marked as 0.

If the actual data is less than the theoretical data and the absolute value of the two differences is greater than a certain threshold on the promise that the same CQI is at the logical location, a certain RB in the logical location is interfered and can be marked as 1.

If the actual data is less than the theoretical data and the absolute value of the two differences is smaller than a certain threshold on the promise that the same CQI is at the logical location, the MCS*RI of a certain RB in the logical location fluctuates and can be marked as 0.

Operation 907, scheduling resources according to the mark model.

Specifically, operation 907 in this embodiment is substantially the same as operation 104 in the first embodiment, which will not be repeated herein.

On the basis of the first embodiment of the present application, heuristics can be performed between frequency bands through obtained online feature data, and the model can be modified adaptively based on the sub-broadband CQI online, to match the model with the cell environment better.

It should be noted that in the third to the fifth embodiments as mentioned above, one RB corresponding to a grid or one RBG corresponding to a grid in the logical location is used for description, but does not mean that in the logical location, part grids correspond to the RB, and other grids correspond to the RBG. When not only part grids correspond to the RB, but also part grids correspond to the RBG, it means that one RBG can actually be regarded as a single individual similar to one RB, which will not be repeated here.

In addition, it can be understood that, the division of the operations in the above methods is only for clarity of description, and can be combined into one operation or split into multiple operations during implementation, as long as they include the same logical relationship, they are all within the protection scope of the present application. Adding insignificant modifications to the algorithm or process or introducing insignificant designs without changing the core design of the algorithm and process are all within the protection scope of the present application.

A sixth embodiment of the present application relates a computer-readable storage medium storing a computer program. When the computer program is executed by the processor, the above method embodiment is realized.

Those skilled in the art can understand that all or part of the operations in the method of the above embodiments can be completed by instructing the relevant hardware through a program. The program is stored in a storage medium, and includes several instructions to cause a device (which may be a single-chip microcomputer, a chip, etc.) or a processor to execute all or part of the operations of the methods described in the various embodiments of the present application. The aforementioned storage medium includes: U disk, removable hard disk, read-only memory (ROM), random access memory (RAM), magnetic disk or optical disk and other media that can store program codes.

Those of ordinary skill in the art can understand that the above-mentioned embodiments are specific embodiments for realizing the present application. However, in practical application, various changes in form and details may be made therein without departing from the scope of the present application.

What is claimed is:

1. A method for scheduling spectrum resources, comprising:

obtaining a grid according to dividing a cell in a network, wherein each grid corresponds to one resource block (RB) or one resource block group (RBG);

obtaining offline feature data;

performing an interference mark on the grid according to the offline feature data, to obtain a mark model; and scheduling spectrum resources according to the mark model;

the method for scheduling spectrum resources further comprising:

obtaining a performance evaluation result of a theoretical network of the mark model and a performance evaluation result of an actual network;

detecting whether the mark model needs to be updated according to the performance evaluation result of the theoretical network and the performance evaluation result of the actual network; and in response to that the mark model needs to be updated, updating the mark model and scheduling spectrum resources according to an updated mark model.

2. The method for scheduling spectrum resources of claim 1, wherein the obtaining the grid according to dividing the cell in the network, each grid corresponds to one RB or one RBG comprises:

dividing the cell according to a path loss level and a horizontal beam, to obtain a logical location; and dividing the spectrum resources at the logical location, to obtain a plurality of grids.

3. The method for scheduling spectrum resources of claim 1, wherein the obtaining the grid according to dividing the cell in the network, each grid corresponds to one RB or one RBG comprises:

dividing the cell according to a vertical beam and a horizontal beam, to obtain a logical location; and dividing the spectrum resources at the logical location, to obtain a plurality of grids.

4. The method for scheduling spectrum resources of claim 1, wherein:

the offline feature data comprises path loss data, beam information, A/N information, spectrum resource information, a channel quality indication (CQI), a modulation coding scheme (MCS), and a rank indicator (RI), and the performing the interference mark on the grid according to the offline feature data, to obtain the mark model comprises:

determining a corresponding grid according to the path loss data, the beam information and the spectrum resource information;

in response to that data corresponding to the grid is determined as newly transmitted data in a transmission time interval (TTI) and the A/N information is data of an acknowledge character (ACK), updating the CQI, the MCS and the RI to the grid;

detecting the grid according to the CQI, the MCS, and the RI, to obtain a detection result; and performing the interference mark on the grid according to the detection result, to obtain the mark model.

5. The method for scheduling spectrum resources of claim 1, wherein:

the offline feature data comprises path loss data, beam information, A/N information, spectrum resource information, a CQI, a MCS, and a RI, and the performing the interference mark on the grid according to the offline feature data, to obtain the mark model comprises:

determining a corresponding grid according to the beam information and the spectrum resource information;

in response to that data corresponding to the grid is determined as newly transmitted data in a TTI and the A/N information is data of an ACK, updating the CQI, the MCS and the RI to the grid;

detecting the grid according to the CQI, the MCS, and the RI, to obtain a detection result; and performing the interference mark on the grid according to the detection result, to obtain the mark model.

6. The method for scheduling spectrum resources of claim 1, wherein:

the offline feature data comprises path loss data, beam information, A/N information, spectrum resource information, a CQI, a MCS, and a RI, and the performing the interference mark on the grid according to the offline feature data, to obtain the mark model comprises:

determining a corresponding grid according to the path loss data and the spectrum resource information;

in response to that data corresponding to the grid is determined as newly transmitted data in a TTI and the A/N information is data of an ACK, updating the CQI, the MCS and the RI to the grid;

detecting the grid according to the CQI, the MCS, and the RI, to obtain a detection result; and performing the interference mark on the grid according to the detection result, to obtain the mark model.

7. The method for scheduling spectrum resources of claim 4, wherein the detecting the grid according to the CQI, the MCS, and the RI, to obtain the detection result comprises:

obtaining a CQI-MCS-RI curve of the corresponding grid according to the CQI, the MCS, and the RI, and detecting whether the grid is interfered according to standard data obtained in advance and the CQI-MCS-RI curve, to obtain the detection result, wherein the standard data is external field data without interference or simulation data.

8. The method for scheduling spectrum resources of claim 4, wherein the detecting the grid according to the CQI, the MCS, and the RI, to obtain the detection result comprises:

counting parameter differences between corresponding grids according to the CQI, the MCS, and the RI, and detecting an interference degree of the grid according to the parameter differences, to obtain the detection result.

9. The method for scheduling spectrum resources of claim 2, wherein the scheduling spectrum resources according to the mark model comprises:

obtaining path loss data of a user and/or beam information, and determining the logical location corresponding to the user;

determining the grid to be used by the user according to the mark model and the logical location; and scheduling spectrum resources for the user according to the grid to be used.

10. The method for scheduling spectrum resources of claim 9, wherein the determining the grid to be used by the user according to the mark model and the logical location comprises:

detecting whether the grid with the interference mark exists in the logical location according to the mark model; and in response to that the grid with the interference mark exists in the logical location and is continuous, and a number of the grids reaches a threshold, analyzing and determining the grid to be used.

11. The method for scheduling spectrum resources of claim 9, wherein the determining the grid to be used by the user according to the mark model and the logical location comprises:

detecting whether the grid with the interference mark exists in the logical location according to the mark model; and in response to that the grid with the interference mark exists in the logical location and the grid with the interference mark is not continuous, determining that the grid without the interference mark is to be used.

12. The method for scheduling spectrum resources of claim 9, wherein the determining the grid to be used by the user according to the mark model and the logical location comprises:

detecting whether the grid with the interference mark exists in the logical location according to the mark model; and in response to that no grid with the interference mark exists in the logical location, determining that all the grids are to be used.

13. The method for scheduling spectrum resources of claim 1, wherein the updating the mark model comprises:

configuring different sub-broadbands for new users, wherein no intersected sub-broadband interval exists in the sub-broadband;

obtaining a non-periodic CQI of different physical resource blocks (PRB) according to the sub-broadband;

obtaining online feature data; and remarking the grid according to the online feature data and the non-periodic CQI, to obtain the updated mark model.

14. The method for scheduling spectrum resources of claim 13, wherein:

the offline feature data comprises the A/N information, the MCS and the RI; and the remarking the grid according to the online feature data and the non-periodic CQI, to obtain the updated mark model comprises:

performing the interference mark on the sub-broadband according to the non-periodic CQI, to obtain a verification tag;

updating the MCS, the RI and the A/N information corresponding to the grid according to the online feature data;

performing the interference mark on the grid according to updated MCS, updated RI, and updated A/N information, to obtain a heuristic tag;

determining whether the heuristic tag is reliable according to the verification tag; and updating the heuristic tag to the mark model in response to that the heuristic tag is reliable, to obtain the updated mark model.

15. A non-transitory computer-readable storage medium, wherein a computer program is stored in the computer-readable storage medium, and when the computer program is executed by a processor, the method for scheduling spectrum resources of claim 1 is implemented.

* * * * *